US012196024B2

(12) United States Patent
Zhu et al.

(10) Patent No.: US 12,196,024 B2
(45) Date of Patent: Jan. 14, 2025

(54) DOOR HINGE ASSEMBLY FOR LAUNDRY TREATMENT DEVICE

(71) Applicants: QINGDAO HAIER DRUM WASHING MACHINE CO., LTD., Shandong (CN); Haier Smart Home Co., Ltd., Shandong (CN)

(72) Inventors: Kai Zhu, Qingdao (CN); Ning Wang, Qingdao (CN); Kai Liu, Qingdao (CN); Zongyuan Weng, Qingdao (CN); Shuai Yang, Qingdao (CN)

(73) Assignees: QINGDAO HAIER DRUM WASHING MACHINE CO., LTD., Qingdao (CN); Haier Smart Home Co., Ltd., Qingdao (CN)

( * ) Notice: Subject to any disclaimer, the term of this patent is extended or adjusted under 35 U.S.C. 154(b) by 961 days.

(21) Appl. No.: 17/281,347

(22) PCT Filed: Feb. 28, 2019

(86) PCT No.: PCT/CN2019/076523
§ 371 (c)(1),
(2) Date: May 12, 2021

(87) PCT Pub. No.: WO2020/062777
PCT Pub. Date: Apr. 2, 2020

(65) Prior Publication Data
US 2022/0042363 A1 Feb. 10, 2022

(30) Foreign Application Priority Data
Sep. 30, 2018 (CN) ......................... 201821622506.6

(51) Int. Cl.
*E05D 7/10* (2006.01)
*D06F 39/14* (2006.01)
*D06F 58/20* (2006.01)

(52) U.S. Cl.
CPC ........... *E05D 7/1066* (2013.01); *D06F 39/14* (2013.01); *D06F 58/20* (2013.01); *E05Y 2900/312* (2013.01)

(58) Field of Classification Search
CPC .................................................... E05D 7/1066
See application file for complete search history.

(56) References Cited

FOREIGN PATENT DOCUMENTS

| | | | |
|---|---|---|---|
| CN | 202023082 | U | 11/2011 |
| CN | 206070197 | U | 4/2017 |

(Continued)

OTHER PUBLICATIONS

International Search Report issued on Jul. 4, 2019 in corresponding International Application No. PCT/CN2019/076523; 5 pages.

*Primary Examiner* — Jason Y Ko
(74) *Attorney, Agent, or Firm* — Maier & Maier, PLLC

(57) ABSTRACT

A door hinge assembly includes a hinge plate and a mounting shaft. The hinge plate includes a mounting plate, a reinforcing plate, and a connecting hook. The reinforcing plate and the connecting hook are each assembled on the mounting plate. The connecting hook is pivotally connected to the mounting shaft. The door hinge assembly further includes a positioning member, and the positioning member is configured to be capable of positioning the mounting plate and/or the reinforcing plate to a cabinet or a door. By providing the positioning member capable of positioning the hinge plate to the cabinet or the door, when the hinge plate is mounted, the hinge plate may first be positioned to the cabinet or the door by the positioning member, and then the hinge plate is tightened by a fastener, so that the assembly efficiency of the door hinge assembly may be increased.

14 Claims, 8 Drawing Sheets

(56) References Cited

FOREIGN PATENT DOCUMENTS

| | | | |
|---|---|---|---|
| CN | 206887547 | U | 1/2018 |
| EP | 2455536 | A1 | 5/2012 |

DOOR HINGE ASSEMBLY FOR LAUNDRY TREATMENT DEVICE

FIELD

The present disclosure belongs to the technical field of clothing treatment, and specifically provides a door hinge assembly for a clothing treatment apparatus.

BACKGROUND

A clothing treatment apparatus is a machine capable of washing, spinning, dry-washing and/or drying clothing. Common clothing treatment apparatuses include a washing machine, a shoe washer, a clothing dryer, a dry washing machine, and a washing-drying integrated machine.

In the prior art, taking a drum washing machine as an example, the drum washing machine includes a cabinet, and a door installed on a front panel of the cabinet. The door is installed on the front panel of the cabinet through a door hinge assembly, and the door hinge assembly includes a hinge plate and an installation shaft are pivotally connected. Generally, the installation shaft is installed on the door, the hinge plate is installed on the cabinet, and the hinge plate is typically installed on the front panel of the cabinet through fasteners such as fastening screws. When installing the hinge plate, it is required to vertically align installation holes on the hinge plate with installation holes on the front panel of the cabinet, and then tighten the hinge plate with fasteners such as fastening screws. However, due to reasons such as relatively small size of the installation holes and limited installation and operation space, the above installation process is time-consuming and laborious, resulting in a low assembly efficiency of the door hinge assembly; moreover, after the door is opened and closed for a long time period, the fasteners such as fastening screws are prone to loosening. As a result, the stability of the connection between the hinge plate and the cabinet is deteriorated, which further affects the airtightness between the door and the cabinet, causing water in the drum washing machine to easily seep out from between the door and the cabinet, and thereby affecting operational safety of the drum washing machine.

Accordingly, there is a need in the art for a new door hinge assembly for a clothing treatment apparatus to solve the above problems.

SUMMARY

In order to solve the above problems in the prior art, that is, in order to solve the problems of low assembly efficiency and poor connection stability of door hinge assemblies of existing clothing treatment apparatuses, the present disclosure provides a door hinge assembly for a clothing treatment apparatus, wherein the clothing treatment apparatus includes a cabinet and a door, the door hinge assembly includes a hinge plate and an installation shaft that are pivotally connected, the hinge plate is disposed on the cabinet, and the installation shaft is disposed on the door; the hinge plate includes an installation plate, a reinforcement plate and connection hooks, both the reinforcement plate and the connection hooks are disposed on the installation plate, both the installation plate and the reinforcement plate are installed on the cabinet, and the connection hooks are pivotally connected with the installation shaft; the door hinge assembly also includes a positioning member, which is arranged to enable the installation plate and/or the reinforcement plate to be positioned to the cabinet.

In a preferred technical solution of the above door hinge assembly, the positioning member includes a first positioning member disposed between the installation plate and the cabinet, and the first positioning member can position the installation plate to the cabinet.

In a preferred technical solution of the above door hinge assembly, the first positioning member includes a positioning groove and a positioning block that match each other, wherein one of the positioning groove and the positioning block is disposed on the installation plate, and the other one of the positioning groove and the positioning block is disposed on the cabinet.

In a preferred technical solution of the above door hinge assembly, at least one L-shaped positioning rib is disposed on a side of the installation plate that faces the cabinet, and the L-shaped positioning rib and the installation plate jointly form the positioning groove.

In a preferred technical solution of the above door hinge assembly, the L-shaped positioning rib includes a first L-shaped positioning rib and a second L-shaped positioning rib, and the positioning block is clamped between the first L-shaped positioning rib and the second L-shaped positioning rib.

In a preferred technical solution of the above door hinge assembly, the first L-shaped positioning rib and the second L-shaped positioning rib are both obliquely disposed on the installation plate, so that a width of an opening formed by one end of the first L-shaped positioning rib and one end of the second L-shaped positioning rib is smaller than a width of an opening formed by the other end of the first L-shaped positioning rib and the other end of the second L-shaped positioning rib.

In a preferred technical solution of the above door hinge assembly, the positioning member includes a second positioning member disposed between the reinforcement plate and the cabinet, and the second positioning member can position the reinforcement plate to the cabinet.

In a preferred technical solution of the above door hinge assembly, the second positioning member includes a positioning claw and a positioning opening that match each other, wherein one of the positioning claw and the positioning opening is disposed on the reinforcement plate, and the other one of the positioning claw and the positioning opening is disposed on the cabinet.

In a preferred technical solution of the above door hinge assembly, the positioning claw includes a first positioning claw and a second positioning claw that are disposed on the reinforcement plate, the positioning opening includes a first positioning opening and a second positioning opening that are disposed on the cabinet and are independent from each other, the first positioning claw matches the first positioning opening, and the second positioning claw matches the second positioning opening.

In a preferred technical solution of the above door hinge assembly, the positioning claw includes a first positioning claw and a second positioning claw that are disposed on the reinforcement plate, the positioning opening is a long-strip-shaped positioning opening, and the first positioning claw and the second positioning claw are respectively clamped at both ends of an inner side of the long-strip-shaped positioning opening.

In another aspect, the present disclosure also provides another door hinge assembly for a clothing treatment apparatus, wherein the clothing treatment apparatus includes a cabinet and a door, the door hinge assembly includes a hinge plate and an installation shaft that are pivotally connected, the hinge plate is disposed on the door, and the installation shaft is disposed on the cabinet; the hinge plate includes an installation plate, a reinforcement plate and connection hooks, both the reinforcement plate and the connection hooks are disposed on the installation plate, both the installation plate and the reinforcement plate are installed on the door, and the connection hooks are pivotally connected with the installation shaft; the door hinge assembly also includes a positioning member, which is arranged to enable the installation plate and/or the reinforcement plate to be positioned to the door.

In a preferred technical solution of the above door hinge assembly, the positioning member includes a first positioning member disposed between the installation plate and the door, and the first positioning member can position the installation plate to the door.

In a preferred technical solution of the above door hinge assembly, the first positioning member includes a positioning groove and a positioning block that match each other, wherein one of the positioning groove and the positioning block is disposed on the installation plate, and the other one of the positioning groove and the positioning block is disposed on the door.

In a preferred technical solution of the above door hinge assembly, at least one L-shaped positioning rib is disposed on a side of the installation plate that faces the door, and the L-shaped positioning rib and the installation plate jointly form the positioning groove.

In a preferred technical solution of the above door hinge assembly, the L-shaped positioning rib includes a first L-shaped positioning rib and a second L-shaped positioning rib, and the positioning block is clamped between the first L-shaped positioning rib and the second L-shaped positioning rib.

In a preferred technical solution of the above door hinge assembly, the first L-shaped positioning rib and the second L-shaped positioning rib are both obliquely disposed on the installation plate, so that a width of an opening formed by one end of the first L-shaped positioning rib and one end of the second L-shaped positioning rib is smaller than a width of an opening formed by the other end of the first L-shaped positioning rib and the other end of the second L-shaped positioning rib.

In a preferred technical solution of the above door hinge assembly, the positioning member includes a second positioning member disposed between the reinforcement plate and the door, and the second positioning member can position the reinforcement plate to the door.

In a preferred technical solution of the above door hinge assembly, the second positioning member includes a positioning claw and a positioning opening that match each other, wherein one of the positioning claw and the positioning opening is disposed on the reinforcement plate, and the other one of the positioning claw and the positioning opening is disposed on the door.

In a preferred technical solution of the above door hinge assembly, the positioning claw includes a first positioning claw and a second positioning claw that are disposed on the reinforcement plate, the positioning opening includes a first positioning opening and a second positioning opening that are disposed on the door and are independent from each other, the first positioning claw matches the first positioning opening, and the second positioning claw matches the second positioning opening.

In a preferred technical solution of the above door hinge assembly, the positioning claw includes a first positioning claw and a second positioning claw that are disposed on the reinforcement plate, the positioning opening is a long-strip-shaped positioning opening, and the first positioning claw and the second positioning claw are respectively clamped at both ends of an inner side of the long-strip-shaped positioning opening.

It can be understood by those skilled in the art that in the preferred technical solution of the present disclosure, a positioning member capable of positioning the hinge plate to the cabinet or the door is provided, so that when the hinge plate is being installed, the positioning member can be used first to position the hinge plate onto the cabinet or the door; that is, the installation holes on the hinge plate are first aligned with the installation holes on the cabinet or the door through the positioning member, and then the hinge plate is tightened through fasteners, so that the assembly efficiency of the door hinge assembly can be improved. Moreover, the positioning member can also play a role of fixing the hinge plate. Even if the fasteners are loosened, the hinge plate can also be fixed on the cabinet or the door through the positioning member, thereby improving the stability of the connection of the hinge plate with the cabinet or the door; that is, the stability of the connection of the door hinge assembly with the cabinet or the door is improved.

Further, a first positioning member is disposed between the installation plate and the cabinet or the door, and the first positioning member includes a positioning groove and a positioning block that match each other; one of the positioning groove and the positioning block is disposed on the installation plate, and the other one of the positioning groove and the positioning block is disposed on the cabinet or the door, so that when the installation plate is being installed, the positioning block can be first clamped in the positioning groove to position the installation plate onto the cabinet or the door; then the fasteners are used to tighten the installation plate, so that the assembly efficiency of the installation plate can be improved, that is, the assembly efficiency of the door hinge assembly can be improved. Moreover, the positioning block is clamped in the positioning groove, so that the installation plate is fixed on the cabinet or the door. Even if the fasteners are loosened, the installation plate can also be fixed on the cabinet or the door, thereby improving the stability of the connection of the installation plate with the cabinet or the door; that is, the stability of the connection of the door hinge assembly with the cabinet or the door is improved.

Still further, the positioning groove is formed by the L-shaped positioning rib and the installation plate jointly. This form of positioning groove can not only play a role of positioning, but also play a role of connecting and fixing, thereby further improving the stability of the connection of the hinge plate with the cabinet or the door.

Still further, the first L-shaped positioning rib and the second L-shaped positioning rib are both obliquely disposed on the installation plate, so that a width of an opening formed by one end of the first L-shaped positioning rib and one end of the second L-shaped positioning rib is smaller than a width of an opening formed by the other end of the first L-shaped positioning rib and the other end of the second L-shaped positioning rib. This arrangement facilitates the insertion of the positioning block, thereby further improving the assembly efficiency of the door hinge assembly.

Still further, a second positioning member is disposed between the reinforcement plate and the cabinet or the door, the second positioning member includes a positioning claw and a positioning opening that match each other, one of the positioning claw and the positioning opening is disposed on the reinforcement plate, and the other one of the positioning claw and the positioning opening is disposed on the cabinet or the door, so that when the reinforcement plate is being installed, the positioning claw can be first clamped in the positioning opening to position the reinforcement plate onto the cabinet or the door, and then the fasteners are used to tighten the reinforcement plate, so that the assembly efficiency of the reinforcement plate can be further improved, that is, the assembly efficiency of the door hinge assembly can be further improved. Moreover, the positioning claw is clamped in the positioning opening, so that the reinforcement plate is fixed on the cabinet or the door. Even if the fasteners are loosened, the reinforcement plate can still be fixed on the cabinet or the door, thereby improving the stability of the connection of the reinforcement plate with the cabinet or the door; that is, the stability of the connection of the door hinge assembly with the cabinet or the door is improved.

Still further, the positioning claw includes a first positioning claw and a second positioning claw that are disposed on the reinforcement plate, the positioning opening includes a first positioning opening and a second positioning opening that are disposed on the cabinet or the door and are independent from each other, the first positioning claw matches the first positioning opening, and the second positioning claw matches the second positioning opening. Through this arrangement, in which the first positioning claw engages with the first positioning opening and the second positioning claw engages with the second positioning opening, the positioning accuracy can be improved, thereby further improving the assembly efficiency of the reinforcement plate, that is, further improving the assembly efficiency of the door hinge assembly.

Still further, the positioning claw includes a first positioning claw and a second positioning claw that are disposed on the reinforcement plate, the positioning opening is a long-strip-shaped positioning opening disposed on the cabinet or the door, and the first positioning claw and the second positioning claw are respectively clamped at both ends of an inner side of the long-strip-shaped positioning opening. Through this arrangement, in which the first positioning claw and the second positioning claw are installed in the long-strip-shaped positioning opening, during installation, the first positioning claw can extend into the long-strip-shaped positioning opening, and then the first positioning claw can slide to one end of the long-strip-shaped positioning opening, so that the second positioning claw is clamped to the other end of the long-strip-shaped positioning opening. As such, the installation can be carried out quickly even when the line of sight is blocked or the installation operation space is limited, so that the assembly efficiency of the reinforcement plate, i.e., the assembly efficiency of the door hinge assembly, can be further improved.

Still further, a first positioning member is disposed between the installation plate and the cabinet or the door, and a second positioning member is disposed between the reinforcement plate and the cabinet or the door, that is, two sets of positioning members are provided. In a case where one group of positioning member may fail, the other group of positioning member can also be used to position the hinge plate to the cabinet or the door. That is, the first positioning member and the second positioning member play a role of double safeguard, so that the stability of the connection of the hinge plate with the cabinet or the door, i.e., the stability of the connection of the door hinge assembly with the cabinet or the door, can be further improved.

BRIEF DESCRIPTION OF THE DRAWINGS

Hereinafter, preferred embodiments of the present disclosure will be described with reference to the accompanying drawings and in conjunction with a drum washing machine. In the drawings.

DETAILED DESCRIPTION

Figure 1:
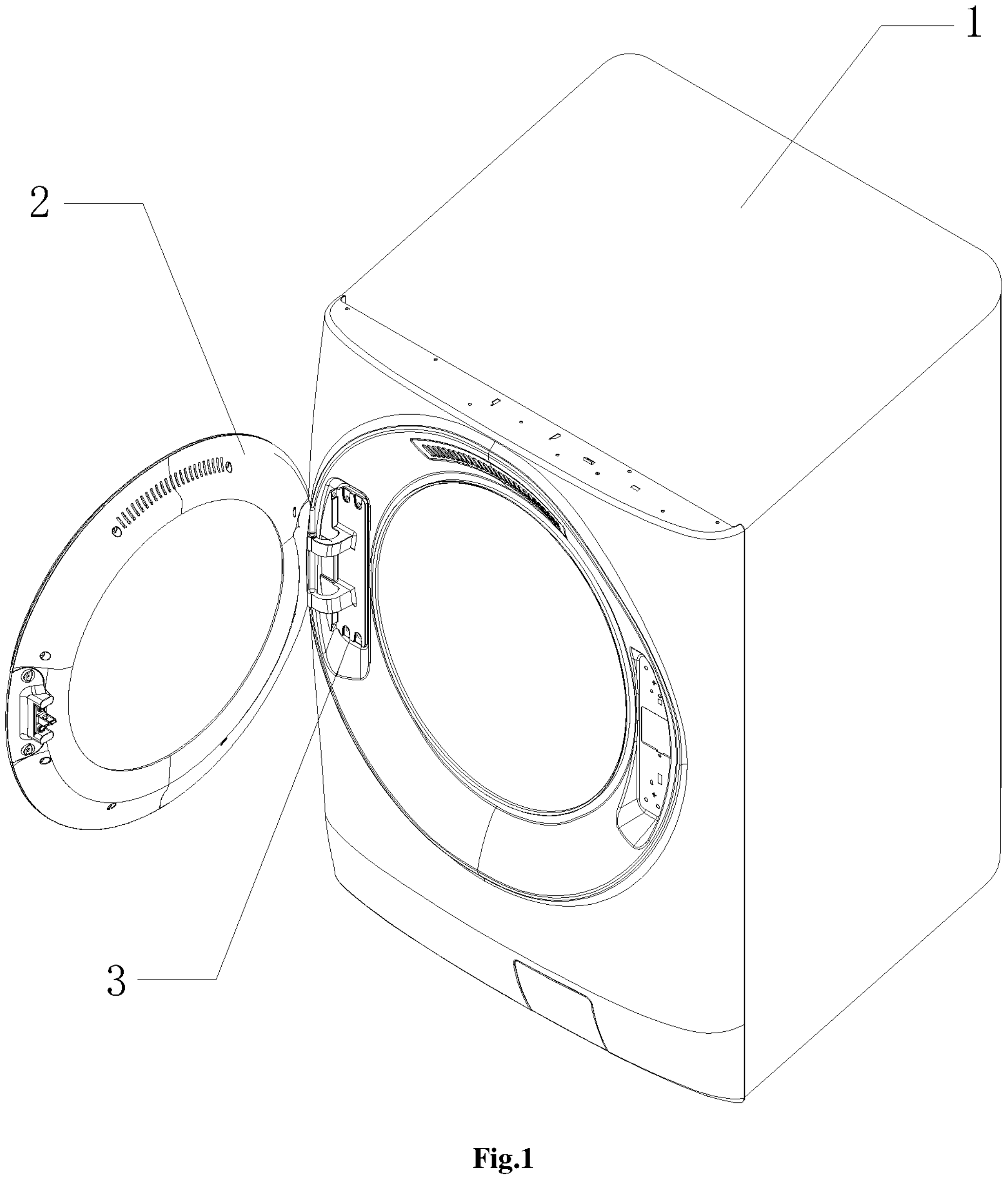
FIG. 1 is a first schematic structural view of a drum washing machine of the present disclosure.

First, it should be understood by those skilled in the art that these embodiments are only used to explain the technical principles of the present disclosure, and are not intended to limit the scope of protection of the present disclosure. For example, although the following embodiments are explained in conjunction with a drum washing machine, this is not limiting. The technical solutions of the present disclosure are also applicable to other clothing treatment apparatuses, such as a drum dryer, a drum dry washing machine, and a washing-drying integrated machine. Such changes to the application object do not deviate from the principle and scope of the present disclosure.

It should be noted that in the description of the present disclosure, directional or positional relationships indicated by terms such as “upper”, “lower”, “inner” and “outer” are based on the directional or positional relationships shown in the drawings. They are merely used for the convenience of description, and do not indicate or imply that the device or element involved must have a specific orientation, or be configured or operated in a specific orientation, and therefore they should not be construed as limiting the present disclosure. In addition, terms “first” and “second” are used for descriptive purpose only, and should not be construed as indicating or implying relative importance.

In addition, it should also be noted that in the description of the present disclosure, unless otherwise clearly specified and defined, terms “install”, “dispose”, “connect” and “connection” should be understood in a broad sense; for example, the connection may be a fixed connection, or may also be a detachable connection, or an integral connection; it may be a mechanical connection, or an electrical connection; it may be a direct connection, or an indirect connection implemented through an intermediate medium, or it may be an internal communication between two elements. For those skilled in the art, the specific meaning of the above terms in the present disclosure can be understood according to specific situations.

Based on the problems of low assembly efficiency and poor connection stability of door hinge assemblies of existing drum washing machines pointed out in the BACKGROUND OF THE INVENTION, the present disclosure provides a hinge assembly for a drum washing machine, aiming at improving the assembly efficiency of the door hinge assembly and the stability of the connection of the door hinge assembly with a cabinet or a door.

The technical solutions of the present disclosure will be described in detail below in conjunction with specific embodiments.

First Embodiment

Figure 2:
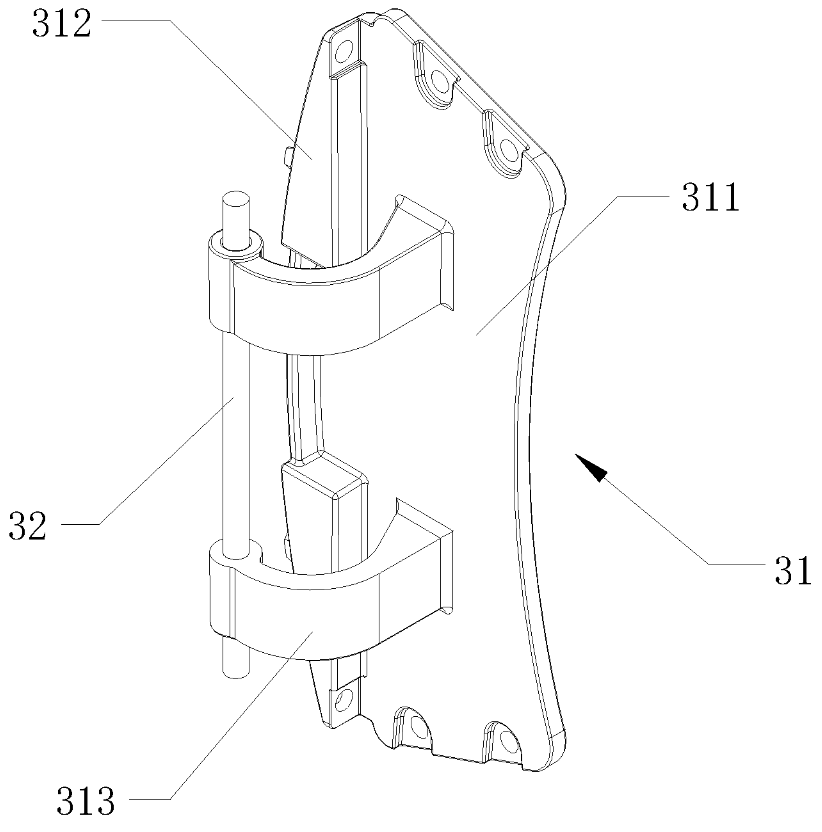
FIG. 2 is a first schematic structural view of a door hinge assembly of the present disclosure.

Referring first to FIGS. 1 and 2, the door hinge assembly of this embodiment will be described in detail.

As shown in FIGS. 1 and 2, the drum washing machine includes a cabinet 1 and a door 2. The door hinge assembly 3 includes a hinge plate 31 and an installation shaft 32 that are pivotally connected. The hinge plate 31 is disposed on the cabinet 1, and the installation shaft 32 is disposed on the door 2. The hinge plate 31 includes an installation plate 311, a reinforcement plate 312 and connection hooks 313. The reinforcement plate 312 and the connection hooks are both disposed on the installation plate 311, and the installation plate 311 and the reinforcement plate 312 are both installed onto the cabinet 1 through fasteners. The connection hooks 313 are pivotally connected to the installation shaft 32. The door hinge assembly 3 further includes a positioning member arranged to be able to position the installation plate 311 and/or the reinforcement plate 312 to the cabinet 1. The positioning member may be disposed between the installation plate 311 and the cabinet 1 to position the installation plate 311 to the cabinet 1, or the positioning member may be disposed between the reinforcement plate 312 and the cabinet 1 to position the reinforcement plate 312 to the cabinet 1, or the positioning members may be disposed between the installation plate 311 and the cabinet 1 as well as between the reinforcement plate 312 and the cabinet 1 to position both the installation plate 311 and the reinforcement plate 312 to the cabinet 1. Those skilled in the art may flexibly set the specific position of the positioning member in practical applications, as long as the installation plate 311 and/or the reinforcement plate 312 can be positioned to the cabinet 1 through the positioning member. In addition, installation holes are provided on both the installation plate 311 and the reinforcement plate 312, and installation holes are also provided at the corresponding positions of the cabinet 1. The installation plate 311 and the reinforcement plate 312 are both fixedly installed on the cabinet 1 through fasteners such as fastening screws.

Preferably, the positioning member includes a first positioning member disposed between the installation plate 311 and the cabinet 1, and the first positioning member can position the installation plate 311 to the cabinet 1. The first positioning member may be configured as a structure in which a positioning groove matches a positioning block, or as a structure in which an insertion groove matches an insertion plate, or as a structure in which a sliding post matches a sliding groove, etc. Those skilled in the art may flexibly set the specific structure of the first positioning member in practical applications, as long as the installation plate 311 can be positioned to the cabinet 1 by the first positioning member.

Preferably, the first positioning member includes a positioning groove and a positioning block that match each other. One of the positioning groove and the positioning block is disposed on the installation plate 311, and the other is disposed on the cabinet 1. The positioning groove may be provided as a countersunk groove structure, or provided as a snap-fit groove structure composed of positioning ribs. Those skilled in the art may flexibly set the specific structure of the positioning groove in practical applications, as long as the installation plate 311 can be positioned to the cabinet 1 through the cooperation of the positioning groove and the positioning block. In addition, the positioning groove may be disposed on the installation plate 311, and correspondingly, the positioning block is disposed on the cabinet 1; or the positioning groove is disposed on the cabinet 1, and correspondingly, the positioning block is disposed on the installation plate 311. Those skilled in the art may flexibly set the specific positions where the positioning groove and the positioning block are disposed in practical applications, as long as the installation plate 311 can be positioned to the cabinet 1 through the cooperation of the positioning groove and the positioning block.

Figure 3:
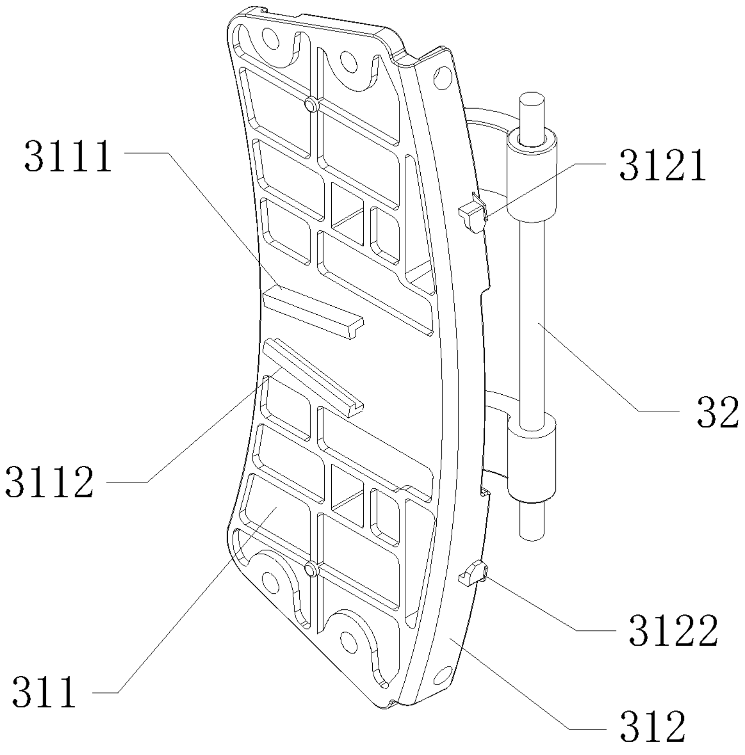
FIG. 3 is a second schematic structural view of the door hinge assembly of the present disclosure.

Preferably, as shown in FIG. 3, at least one L-shaped positioning rib is provided on a side of the installation plate 311 that faces the cabinet 1, and the L-shaped positioning rib and the installation plate 311 jointly form a positioning groove. The L-shaped positioning rib is fixedly connected to the installation plate 311 to facilitate replacement of the L-shaped positioning rib, or the L-shaped positioning rib and the installation plate 311 are provided as one piece to facilitate the integral forming and manufacturing of the L-shaped positioning rib and the installation plate 311. Those skilled in the art may flexibly set the specific connection form of the L-shaped positioning rib and the installation plate 311 in practical applications, as long as the L-shaped positioning rib and the installation plate 311 can be fixedly connected.

Figure 5:
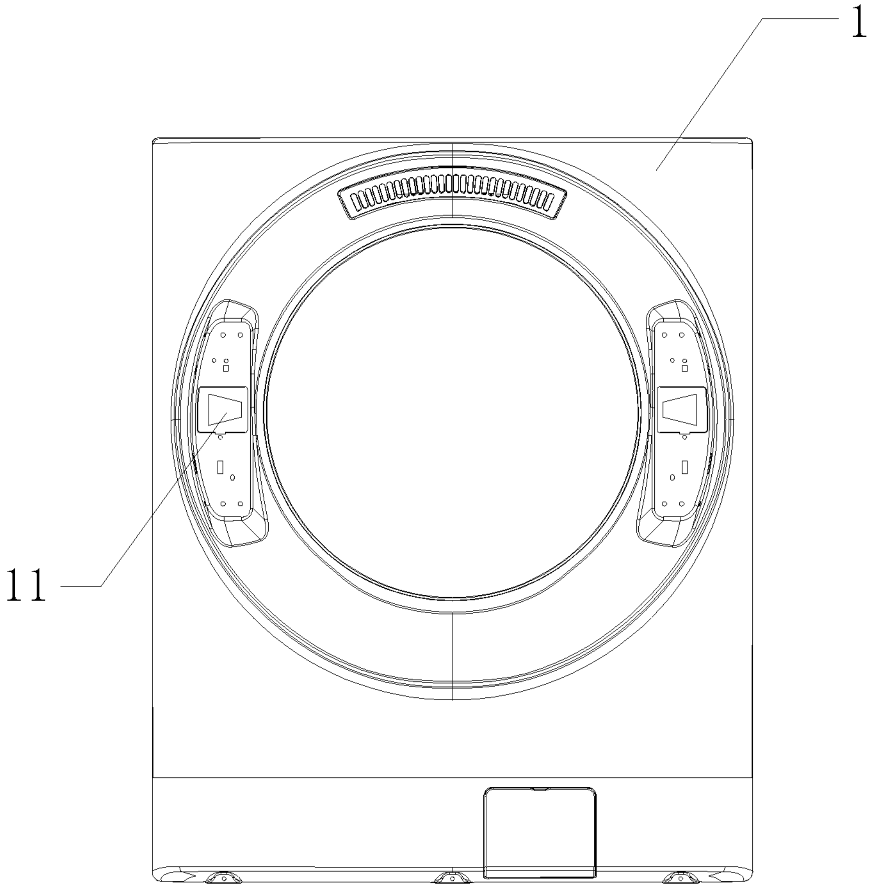
FIG. 5 is a schematic structural view of a cabinet of the present disclosure.

Preferably, as shown in FIG. 3, the L-shaped positioning rib includes a first L-shaped positioning rib 3111 and a second L-shaped positioning rib 3112, and a positioning block 11 is clamped between the first L-shaped positioning rib 3111 and the second L-shaped positioning rib 3112. Further preferably, the first L-shaped positioning rib 3111 and the second L-shaped positioning rib 3112 are both obliquely disposed on the installation plate 311, so that a width of an opening formed by one end of the first L-shaped positioning rib 3111 and one end of the second L-shaped positioning rib 3112 is smaller than a width of an opening formed by the other end of the first L-shaped positioning rib 3111 and the other end of the second L-shaped positioning rib 3112. Correspondingly, a width of one end of the positioning block 11 is smaller than a width of the other end of the positioning block; that is, as shown in FIG. 5, the positioning block 11 is provided as a trapezoidal structure so that the positioning block 11 can be clamped between the first L-shaped positioning rib 3111 and the second L-shaped positioning rib 3112. Of course, the first L-shaped positioning rib 3111 and the second L-shaped positioning rib 3112 may also be arranged in parallel on the installation plate 311. Correspondingly, the widths of the two ends of the positioning block 11 are adjusted so that the positioning block 11 can be clamped between the first L-shaped positioning rib 3111 and the second L-shaped positioning rib 3112.

Preferably, the positioning member includes a second positioning member disposed between the reinforcement plate 312 and the cabinet 1, and the second positioning member can position the reinforcement plate 312 to the cabinet 1. The second positioning member can be provided as a structure in which a positioning claw matches a positioning opening, or as a structure in which a snap-fit groove matches a snap-fit plate, or as a structure in which a sliding post matches a sliding groove, etc. Those skilled in the art may flexibly set the specific structure of the second positioning member in practical applications, as long as the reinforcement plate 312 can be positioned to the cabinet 1 by the second positioning member.

Preferably, the second positioning member includes a positioning claw and a positioning opening that match each other. One of the positioning claw and the positioning opening is disposed on the reinforcement plate 312, and the other is disposed on the cabinet 1. In a possible situation, the positioning claw is disposed on the reinforcement plate 312, and correspondingly, the positioning opening is disposed on the cabinet 1; or in another possible situation, the positioning claw is disposed on the cabinet 1, and correspondingly, the positioning opening is disposed on the reinforcement plate 312. Those skilled in the art may flexibly set the specific positions where the positioning claw and the positioning opening are disposed in practical applications, as long as the reinforcement plate 312 can be positioned to the cabinet 1 through the cooperation of the positioning claw and the positioning opening.

Figure 6:
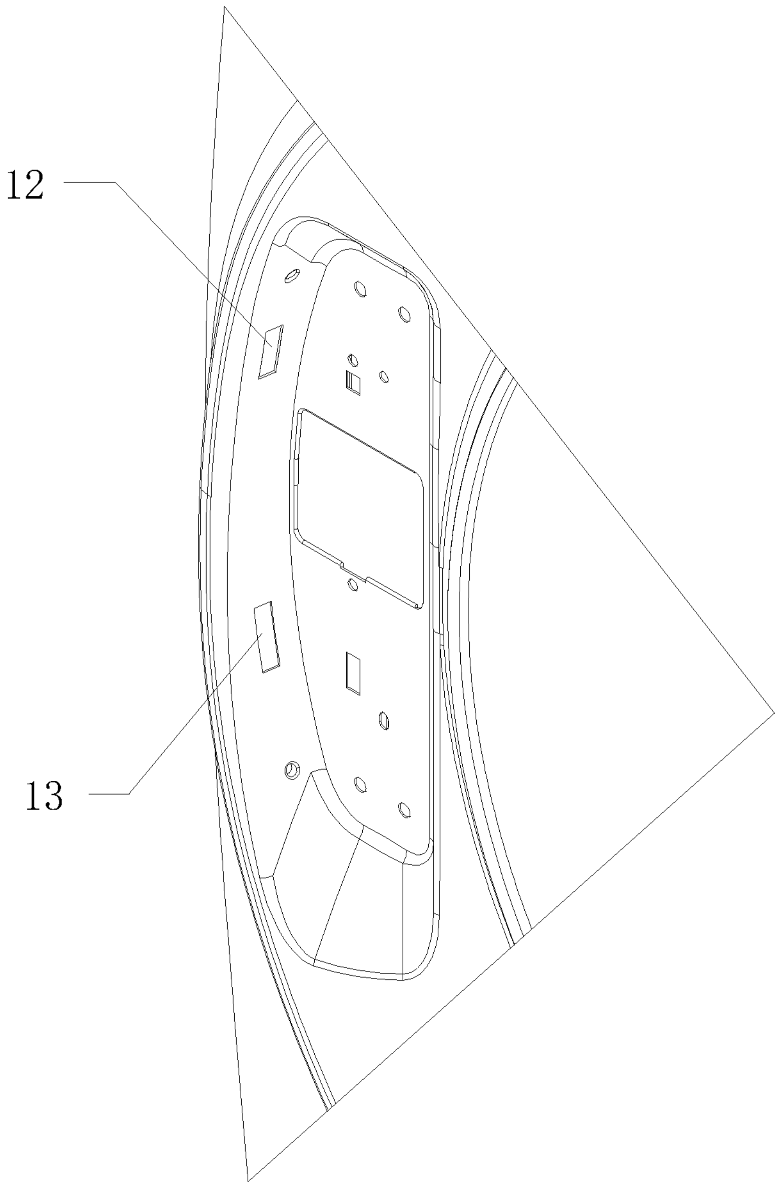
FIG. 6 is a first schematic structural view of a positioning opening of the present disclosure.
Figure 7:
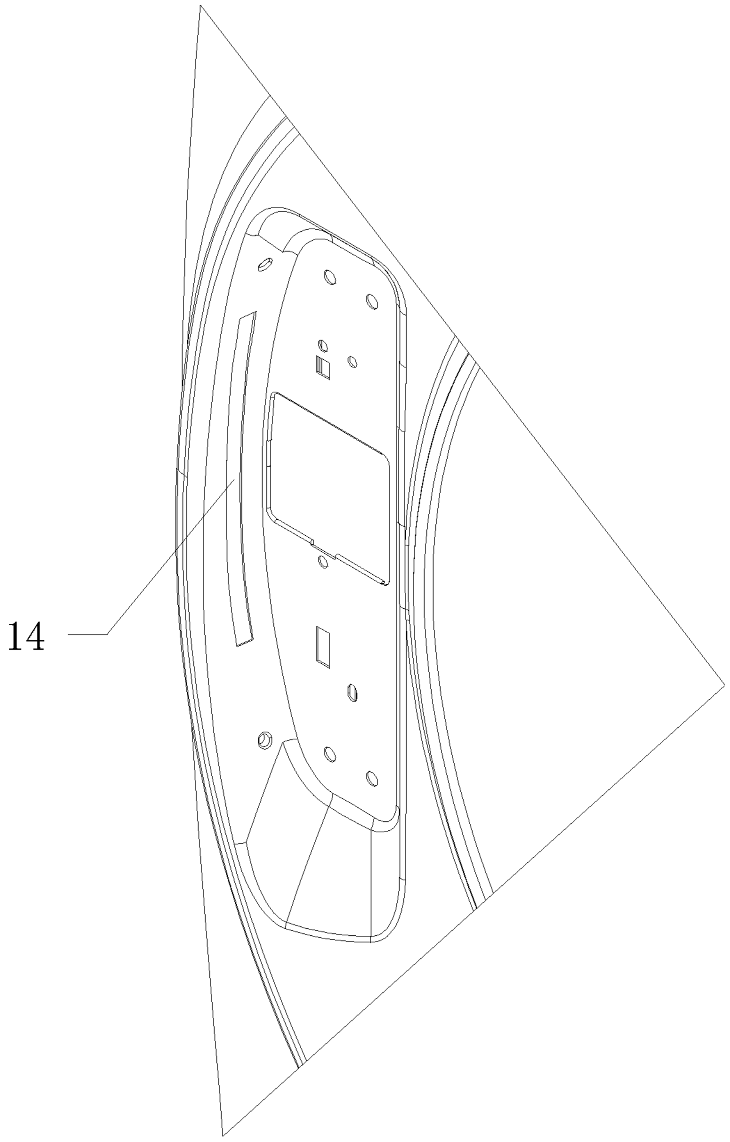
FIG. 7 is a second schematic structural view of the positioning opening of the present disclosure.

Preferably, as shown in FIGS. 3 and 6, the positioning claw includes a first positioning claw 3121 and a second positioning claw 3122 that are disposed on the reinforcement plate 312, and the positioning opening include a first positioning opening 12 and a second positioning opening 13 that are disposed on the cabinet 1 and are independent from each other. The first positioning claw 3121 matches the first positioning opening 12, and the second positioning claw 3122 matches the second positioning opening 13; of course, as shown in FIG. 7, it is also possible to set the positioning opening as a long-strip-shaped positioning opening 14 so that the first positioning claw 3121 and the second positioning claw 3122 are respectively clamped at both ends of an inner side of the long-strip-shaped positioning opening 14.

Figure 4:
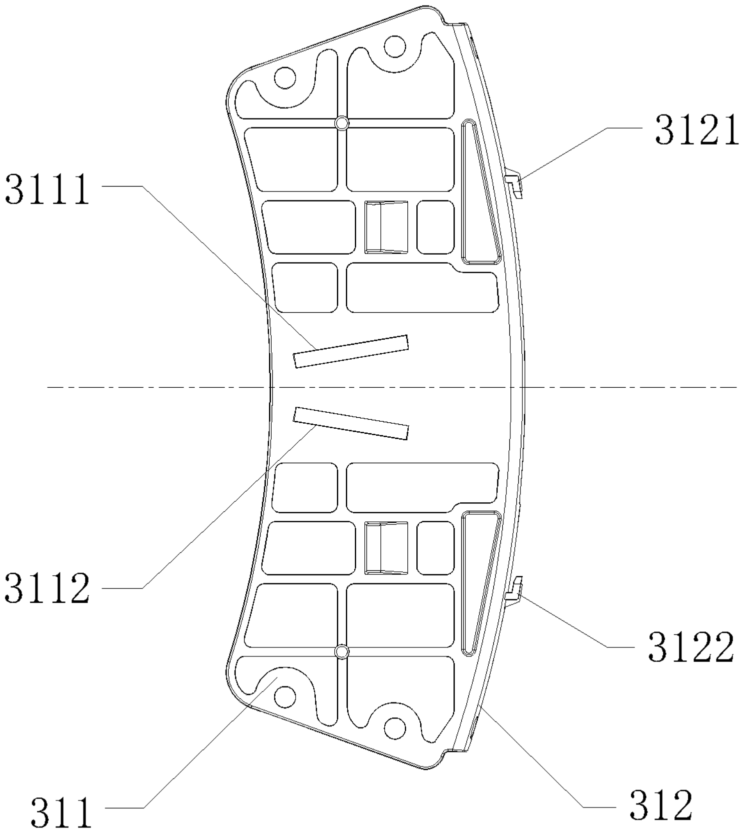
FIG. 4 is a third schematic structural view of the door hinge assembly of the present disclosure.

In addition, it should also be noted that in order to meet some special requirements, for example, in order to facilitate the exchange of an opening direction of the door 2, as shown in FIG. 4, the first L-shaped positioning rib 3111 and the second L-shaped positioning rib 3112 may be provided as a symmetrical structure; that is, they are provided symmetrically up and down with respect to a center line shown in FIG. 4; the first positioning claw 3121 and the second positioning claw 3122 are also provided as a symmetrical structure, that is, they are provided symmetrically up and down with respect to the center line shown in FIG. 4.

Second Embodiment

Figure 8:
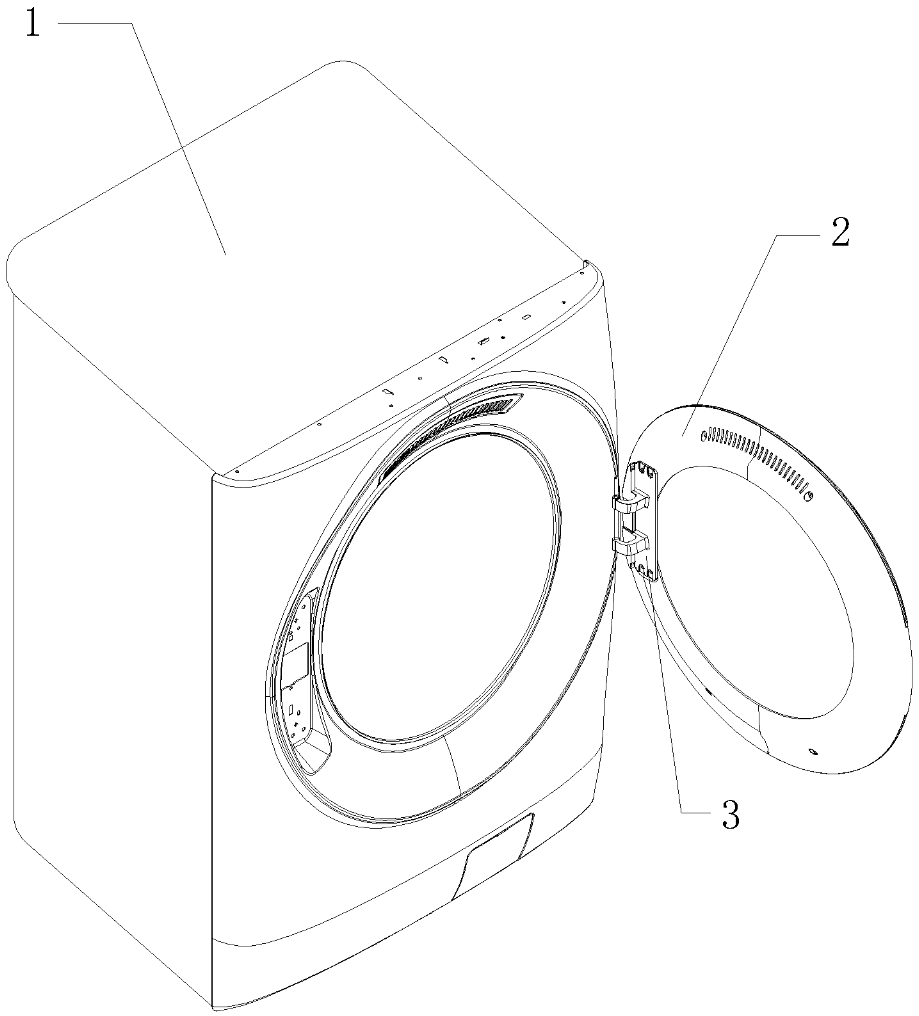
FIG. 8 is a second schematic structural view of the drum washing machine of the present disclosure.

Referring first to FIGS. 2 and 8, the door hinge assembly of this embodiment will be described in detail.

As shown in FIGS. 2 and 8, the drum washing machine includes a cabinet 1 and a door 2. The door hinge assembly 3 includes a hinge plate 31 and an installation shaft 32 that are pivotally connected. The hinge plate 31 is disposed on the door 2, and the installation shaft 32 is disposed on the cabinet 1. The hinge plate 31 includes an installation plate 311, a reinforcement plate 312 and connection hooks 313. The reinforcement plate 312 and the connection hooks are both disposed on the installation plate 311, and the installation plate 311 and the reinforcement plate 312 are both installed onto the door 2 through fasteners. The connection hooks 313 are pivotally connected to the installation shaft 32. The door hinge assembly 3 further includes a positioning member arranged to be able to position the installation plate 311 and/or the reinforcement plate 312 to the door 2. The positioning member may be disposed between the installation plate 311 and the door 2 to position the installation plate 311 to the door 2, or the positioning member may be disposed between the reinforcement plate 312 and the door 2 to position the reinforcement plate 312 to the door 2, or the positioning members may be disposed between the installation plate 311 and the door 2 as well as between the reinforcement plate 312 and the door 2 to position both the installation plate 311 and the reinforcement plate 312 to the door 2. Those skilled in the art may flexibly set the specific position of the positioning member in practical applications, as long as the installation plate 311 and/or the reinforcement plate 312 can be positioned to the door 2 through the positioning member. In addition, installation holes are provided on both the installation plate 311 and the reinforcement plate 312, and installation holes are also provided at the corresponding positions of the door 2. The installation plate 311 and the reinforcement plate 312 are both fixedly installed on the door 2 through fasteners such as fastening screws.

Preferably, the positioning member includes a first positioning member disposed between the installation plate 311 and the door 2, and the first positioning member can position the installation plate 311 to the door 2. The first positioning member may be configured as a structure in which a positioning groove matches a positioning block, or as a structure in which an insertion groove matches an insertion plate, or as a structure in which a sliding post matches a sliding groove, etc. Those skilled in the art may flexibly set the specific structure of the first positioning member in practical applications, as long as the installation plate 311 can be positioned to the door 2 by the first positioning member.

Preferably, the first positioning member includes a positioning groove and a positioning block that match each other. One of the positioning groove and the positioning block is disposed on the installation plate 311, and the other is disposed on the door 2. The positioning groove may be provided as a countersunk groove structure, or provided as a snap-fit groove structure composed of positioning ribs. Those skilled in the art may flexibly set the specific structure of the positioning groove in practical applications, as long as the installation plate 311 can be positioned to the door 2 through the cooperation of the positioning groove and the positioning block. In addition, the positioning groove may be disposed on the installation plate 311, and correspondingly, the positioning block is disposed on the door 2; or the positioning groove is disposed on the door 2, and correspondingly, the positioning block is disposed on the installation plate 311. Those skilled in the art may flexibly set the specific positions where the positioning groove and the positioning block are disposed in practical applications, as long as the installation plate 311 can be positioned to the door 2 through the cooperation of the positioning groove and the positioning block.

Preferably, as shown in FIG. 3, at least one L-shaped positioning rib is provided on a side of the installation plate 311 that faces the door 2, and the L-shaped positioning rib and the installation plate 311 jointly form a positioning groove. The L-shaped positioning rib is fixedly connected to the installation plate 311 to facilitate replacement of the L-shaped positioning rib, or the L-shaped positioning rib and the installation plate 311 are provided as one piece to facilitate the integral forming and manufacturing of the L-shaped positioning rib and the installation plate 311. Those skilled in the art may flexibly set the specific connection form of the L-shaped positioning rib and the installation plate 311 in practical applications, as long as the L-shaped positioning rib and the installation plate 311 can be fixedly connected.

Preferably, as shown in FIG. 3, the L-shaped positioning rib includes a first L-shaped positioning rib 3111 and a second L-shaped positioning rib 3112, and a positioning block 11 is clamped between the first L-shaped positioning rib 3111 and the second L-shaped positioning rib 3112. Further preferably, the first L-shaped positioning rib 3111 and the second L-shaped positioning rib 3112 are both obliquely disposed on the installation plate 311, so that a width of an opening formed by one end of the first L-shaped positioning rib 3111 and one end of the second L-shaped positioning rib 3112 is smaller than a width of an opening formed by the other end of the first L-shaped positioning rib 3111 and the other end of the second L-shaped positioning rib 3112. Correspondingly, a width of one end of the positioning block is smaller than a width of the other end of the positioning block; that is, the positioning block is provided as a trapezoidal structure so that the positioning block can be clamped between the first L-shaped positioning rib 3111 and the second L-shaped positioning rib 3112. Of course, the first L-shaped positioning rib 3111 and the second L-shaped positioning rib 3112 may also be arranged in parallel on the installation plate 311. Correspondingly, the widths of the two ends of the positioning block are adjusted so that the positioning block can be clamped between the first L-shaped positioning rib 3111 and the second L-shaped positioning rib 3112.

Preferably, the positioning member includes a second positioning member disposed between the reinforcement plate 312 and the door 2, and the second positioning member can position the reinforcement plate 312 to the door 2. The second positioning member can be provided as a structure in which a positioning claw matches a positioning opening, or as a structure in which a snap-fit groove matches a snap-fit plate, or as a structure in which a sliding post matches a sliding groove, etc. Those skilled in the art may flexibly set the specific structure of the second positioning member in practical applications, as long as the reinforcement plate 312 can be positioned to the door 2 by the second positioning member.

Preferably, the second positioning member includes a positioning claw and a positioning opening that match each other. One of the positioning claw and the positioning opening is disposed on the reinforcement plate 312, and the other is disposed on the door 2. In a possible situation, the positioning claw is disposed on the reinforcement plate 312, and correspondingly, the positioning opening is disposed on the door 2; or in another possible situation, the positioning claw is disposed on the door 2, and correspondingly, the positioning opening is disposed on the reinforcement plate 312. Those skilled in the art may flexibly set the specific positions where the positioning claw and the positioning opening are disposed in practical applications, as long as the reinforcement plate 312 can be positioned to the door 2 through the cooperation of the positioning claw and the positioning opening.

Preferably, as shown in FIGS. 3 and 6, the positioning claw includes a first positioning claw 3121 and a second positioning claw 3122 that are disposed on the reinforcement plate 312, and the positioning opening include a first positioning opening and a second positioning opening that are disposed on the door 2 and are independent from each other. The first positioning claw 3121 matches the first positioning opening, and the second positioning claw 3122 matches the second positioning opening; of course, it is also possible to set the positioning opening as a long-strip-shaped positioning opening so that the first positioning claw 3121 and the second positioning claw 3122 are respectively clamped at both ends of an inner side of the long-strip-shaped positioning opening.

In addition, it should also be noted that in order to meet some special requirements, for example, in order to facilitate the exchange of an opening direction of the door 2, as shown in FIG. 4, the first L-shaped positioning rib 3111 and the second L-shaped positioning rib 3112 may be provided as a symmetrical structure; that is, they are provided symmetrically up and down with respect to the center line shown in FIG. 4; the first positioning claw 3121 and the second positioning claw 3122 are also provided as a symmetrical structure, that is, they are provided symmetrically up and down with respect to the center line shown in FIG. 4.

Hitherto, the technical solutions of the present disclosure have been described in conjunction with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features, and all the technical solutions after these changes or replacements will fall within the scope of protection of the present disclosure.

What is claimed is:

1. A door hinge assembly for a clothing treatment apparatus, the clothing treatment apparatus comprising a cabinet and a door, the door hinge assembly comprising a hinge plate and an installation shaft that are pivotally connected, the hinge plate being disposed on the cabinet, and the installation shaft being disposed on the door; wherein the hinge plate comprises an installation plate, a reinforcement plate and connection hooks, both the reinforcement plate and the connection hooks are disposed on the installation plate, both the installation plate and the reinforcement plate are installed on the cabinet, and the connection hooks are pivotally connected with the installation shaft; and the door hinge assembly also comprises a positioning member, which is arranged to enable the installation plate and/or the reinforcement plate to be positioned to the cabinet, wherein the positioning member comprises a first positioning member disposed between the installation plate and the cabinet, and the first positioning member can position the installation plate to the cabinet;

wherein the first positioning member comprises a positioning groove and a positioning block that match each other, one of the positioning groove and the positioning block is disposed on the installation plate, and the other one of the positioning groove and the positioning block is disposed on the cabinet; and wherein at least one L-shaped positioning rib is disposed on a side of the installation plate that faces the cabinet, and the L-shaped positioning rib and the installation plate jointly form the positioning groove.

2. The door hinge assembly according to claim 1, wherein the L-shaped positioning rib comprises a first L-shaped positioning rib and a second L-shaped positioning rib, and the positioning block is clamped between the first L-shaped positioning rib and the second L-shaped positioning rib.

3. The door hinge assembly according to claim 2, wherein the first L-shaped positioning rib and the second L-shaped positioning rib are both obliquely disposed on the installation plate, so that a width of an opening formed by one end of the first L-shaped positioning rib and one end of the second L-shaped positioning rib is smaller than a width of an opening formed by the other end of the first L-shaped positioning rib and the other end of the second L-shaped positioning rib.

4. The door hinge assembly according to claim 1, wherein the positioning member comprises a second positioning member disposed between the reinforcement plate and the cabinet, and the second positioning member can position the reinforcement plate to the cabinet.

5. The door hinge assembly according to claim 4, wherein the second positioning member comprises a positioning claw and a positioning opening that match each other, one of the positioning claw and the positioning opening is disposed on the reinforcement plate, and the other one of the positioning claw and the positioning opening is disposed on the cabinet.

6. The door hinge assembly according to claim 5, wherein the positioning claw comprises a first positioning claw and a second positioning claw that are disposed on the reinforcement plate, the positioning opening comprises a first positioning opening and a second positioning opening that are disposed on the cabinet and are independent from each other, the first positioning claw matches the first positioning opening, and the second positioning claw matches the second positioning opening.

7. The door hinge assembly according to claim 5, wherein the positioning claw comprises a first positioning claw and a second positioning claw that are disposed on the reinforcement plate, the positioning opening is a long-strip-shaped positioning opening, and the first positioning claw and the second positioning claw are respectively clamped at both ends of an inner side of the long-strip-shaped positioning opening.

8. A door hinge assembly for a clothing treatment apparatus, the clothing treatment apparatus comprising a cabinet and a door, the door hinge assembly comprising a hinge plate and an installation shaft that are pivotally connected, the hinge plate being disposed on the door, and the installation shaft being disposed on the cabinet; wherein the hinge plate comprises an installation plate, a reinforcement plate and connection hooks, both the reinforcement plate and the connection hooks are disposed on the installation plate, both the installation plate and the reinforcement plate are installed on the door, and the connection hooks are pivotally connected with the installation shaft; and the door hinge assembly also comprises a positioning member, which is arranged to enable the installation plate and/or the reinforcement plate to be positioned to the door, wherein the positioning member comprises a first positioning member disposed between the installation plate and the door, and the first positioning member can position the installation plate to the door;

wherein the first positioning member comprises a positioning groove and a positioning block that match each other, one of the positioning groove and the positioning block is disposed on the installation plate, and the other one of the positioning groove and the positioning block is disposed on the door; and wherein at least one L-shaped positioning rib is disposed on a side of the installation plate that faces the door, and the L-shaped positioning rib and the installation plate jointly form the positioning groove.

9. The door hinge assembly according to claim 8, wherein the L-shaped positioning rib comprises a first L-shaped positioning rib and a second L-shaped positioning rib, and the positioning block is clamped between the first L-shaped positioning rib and the second L-shaped positioning rib.

10. The door hinge assembly according to claim 9, wherein the first L-shaped positioning rib and the second L-shaped positioning rib are both obliquely disposed on the installation plate, so that a width of an opening formed by one end of the first L-shaped positioning rib and one end of the second L-shaped positioning rib is smaller than a width of an opening formed by the other end of the first L-shaped positioning rib and the other end of the second L-shaped positioning rib.

11. The door hinge assembly according to claim 8, wherein the positioning member comprises a second positioning member disposed between the reinforcement plate and the door, and the second positioning member can position the reinforcement plate to the door.

12. The door hinge assembly according to claim 11, wherein the second positioning member comprises a positioning claw and a positioning opening that match each other, one of the positioning claw and the positioning opening is disposed on the reinforcement plate, and the other one of the positioning claw and the positioning opening is disposed on the door.

13. The door hinge assembly according to claim 12, wherein the positioning claw comprises a first positioning claw and a second positioning claw that are disposed on the reinforcement plate, the positioning opening comprises a first positioning opening and a second positioning opening that are disposed on the door and are independent from each other, the first positioning claw matches the first positioning opening, and the second positioning claw matches the second positioning opening.

14. The door hinge assembly according to claim 12, wherein the positioning claw comprises a first positioning claw and a second positioning claw that are disposed on the reinforcement plate, the positioning opening is a long-strip-shaped positioning opening, and the first positioning claw and the second positioning claw are respectively clamped at both ends of an inner side of the long-strip-shaped positioning opening.

* * * * *